The invention concerns an arrangement for weakening, extinguishing and/or deflecting reflection echoes of physical, particularly electromagnetic waves, for example, centimeter waves. Electromagnetic waves used for locating target objects, particularly radar waves, have been destroyed up to now by absorption in order to avoid detection.

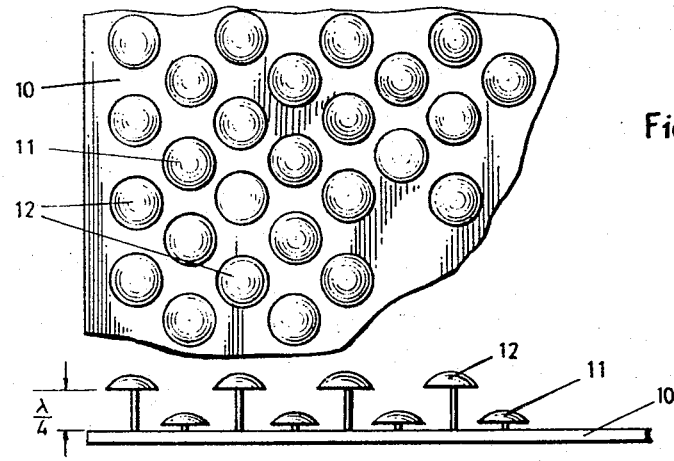
Fig. 1A
Fig. 1B
Fig. 2
Fig. 3A
Fig. 3B
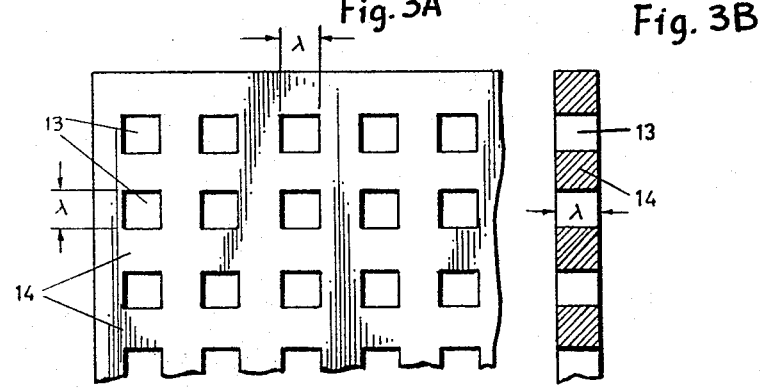
INVENTOR
Lothar Straub
BY
ATTORNEYS / 3,307,186
ARRANGEMENT FOR WEAKENING, EX-
TINGUISHING AND/OR DEFLECTING
REFLECTED WAVES
Lothar Straub, Gartenstrasse 41, Tubingen, Germany
Filed Feb. 19, 1965, Ser. No. 434,007
9 Claims. (Cl. 343—18)

According to this invention it is intended either to deflect such waves by a grid arrangement in a direction deviating from the incoming wave or to direct it in the case of a diffraction, or to extinguish the reflection echo and the reflection.

It is known that a given wave is diffracted by grids and space grids in strictly defined directions. The diffraction waves are added and subtracted in certain angles regarding the direction of incidence of the incoming wave. The invention is based on the problem of extinguishing or at least weakening to a considerable extent by superposition of the waves in the axis and direction of the transmitter-object-receiver by means of a grid arrangement.

This problem is solved by an areal regular arrangement of a plurality of diffraction elements in phase-opposition, for example, in two adjacent planes, which are associated with each other and diffract the incoming wavetrain in a mutually opposite phase either by spatial displacement or by a different phase delay.

In a specific embodiment, the elements are combined in an area space grid which are, for example, webs with a shorter length than the wavelength. They form edges of imagined tetrahedrons or polygonal pyramids which are joined with each other at the bases, thus forming together an areal grid system whose thickness is equal to the height of the tetrahedrons or pyramids, namely lambda/4. This arrangement results in a plurality of diffraction points in another plane, spaced in regular intervals, the two planes being staggered by lambda/4. With a wave train falling perpendicularly to these planes (grid planes), at least the reflection echo is distinguished by interference in the direction of the transmitter, due to the diffraction waves formed in phase opposition. As far as other directions are concerned, which are not of interest, however for the present considerations, the diffraction waves can add up and form a pronounced maximum.

The grid elements can consist of metal strips or metal wire and be joined with each other in any way. The grid form can be produced, for example, by stamping and/or bending. The grid can also consist as a sheet of flexible plastic, the surface of the elements being metallized by a suitable coat and/or being wave-absorbent. In this manner large surfaces can be produced with the indicated space grid structure, which are used as a cover for objects of any size to be protected against radio bearing.

According to another particular embodiment of the invention, the grid consists of an elastic material, for example, elastic plastic, and the individual elements are hollow, the cavities of all elements communicating with each other. The grid can be increased by inflation and the distance of the grid tops and bottoms containing the ends of the elements can be adapted to different wavelengths.

Instead of a reflecting grid, the device can also be constructed as a phase grid, with which similar effects can be obtained. In this case the arrangement according to the invention consists of a phase-retarding, preferably flexible, flat material with a thickness of about lambda, in which are provided in regular intervals apertures (for example rectangular) extending through the thickness of the material, whose diameter is about lambda, while regular webs remain between the apertures whose thickness is likewise about lambda.

The invention is not limited to the extinction or weakening of electromagnetic waves. The grid arrangement claimed and described here can also be used by corresponding dimensioning for the production and amplification of the reflection echo in certain intended directions, as it is expedient, for example, to reduce accidents in boats sailing in fog, etc.

The invention will be described more fully on the basis of embodiments represented in the attached drawing, wherein FIGURE 1 shows an embodiment to illustrate the invention, FIGURE 2 shows a grid system according to another embodiment, and FIGURE 3 shows an arrangement according to the invention acting as a phase grid.

The basic idea of the invention can be seen best from FIGURE 1. Into a base 10 are driven in regular intervals nails or thumbtacks so that only the heads protrude from the base. Positioned to fill the gap between four completely driven-in nails 11 is another nail 12, whose head stands over the heads of the nails 11 by a certain amount, namely lambda/4. If a wave train falls in perpendicular to the two planes formed by the plurality of heads, each nail head forms the starting point for a new elementary wave. The reflections are extinguished in the direction of the wave transmitter, since the inphase- opposed diffraction waves interfere. They can add up, however, in other directions according to known physical principles, and form radiation maxima, which is without significance, however, for the indicated purpose. If the incoming wave train impinges in any non-perpendicular angle on the planes of the arrangement, then this will have an effect similar to a mirror. That is, the new elementary waves formed at the diffraction points (nail heads) will add up, taking into account the angle of incidence in another direction of the corresponding exit angle. Depending on the angle of incidence, there is an additional superposition of the waves issuing from the two planes, which do not, however, have in any case a component perpendicular to the direction of incidence of the waves. The embodiment according to the invention shows in FIGURE 2 a simple grid system to reduce or eliminate wave reflections. As in the first example, a plurality of associated diffraction elements arranged in two adjoining planes, are produced by a triangular-pyramidal arrangement of webs, which are arranged at the bases and apices of the individual pyramids. The distance of the two planes, that is, the height of the pyramid, is lambda/4. The length of the individual webs forming the pyramid edges corresponds, for example, to the wave length or is smaller than the latter. Instead of a triangular pyramid the diffraction elements (diffraction points) can also be formed by tetrahedrons or by polygonal pyramids and similar structures of corresponding height.

The method of operation of this grid system is the same as in the above described example. Wave trains falling in perpendicularly are extinguished by diffraction and subsequent superposition in the direction of incidence. Waves falling in under other angles are reflected after diffraction in certain physically defined angles.

The grid system according to FIGURE 2 consists of metal or plastic. If it is made of metal, stamping is possible, with subsequent bending and, if necessary, embossing of sufficiently ductile sheet material. Manufacture from plastic, for example, by injecting molding, may be even simpler. The plastic material can be metallized subsequently with a coat. Finally the grid system could be made completely or partly of wave-absorbing material or be provided with a corresponding coat. An adaptation of the distance of the two or more grid planes to different wave lengths can be achieved according to another feature of the invention if the grid system is made of an elastic material. If the individual grid webs are hollow and if the cavities of all webs are in communication with each other, the grid can be increased by inflation and the distance of the diffracting elementary planes thus varied.

According to FIGURE 3, the same effect can be achieved with a phase grid. Such an arrangement consists of a preferably flexible material with a thickness of about lambda, having phase-retarding properties regarding the incoming wave. In the material are provided in regular intervals rectangular apertures 13, for example, by molding or stamping, whose diameter is equal to the wave length or less. The material webs 14 remaining between the apertures have likewise a width equal to the wave length or less. Hereto, a metallized and/or additional wave absorbing coat can be provided. This is not necessary, however, because this is a phase grid. The material has an index of refraction at which the waves are so delayed in their phase that an extinction and super-position is obtained on the side opposite the incidence.

In all the above described embodiments the important thing is to make the grid structure relatively flexible so that larger surfaces with irregular contours can be covered.

While the invention has been described in connection with different embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains, and as may be applied to the essential features hereinbefore set forth and as fall within the scope of the invention or the limits of the appended claims.

Having thus described my invention, what I claim is:

1. Arrangement for weakening, extinguishing and deflecting reflection echoes, waves and the like, comprising an areal regular arrangement of a plurality of elements, arranged in phase opposition in two adjoining planes, which are associated with each other and divert the incoming wave trains in a mutually opposite phase, said elements joined in an areal space grid of webs having a length not greater than the wave lengths being deflected and forming the edges of imagined tetrahedrons which are joined with each other at the bases and form an areal grid system whose thickness is eqaul to the height of said tetrahedrons.

2. An arrangement according to claim 1 wherein the heights of said tetrahedrons is equal to lamda.

3. Arrangement according to claim 1, wherein said grid elements are made of metal strips.

4. Arrangement according to claim 1, wherein said grid has a metallic surface.

5. Arrangement according to claim 1, wherein said grid consists of flexible material.

6. An arrangement according to claim 5 wherein said flexible material is of a wave-absorbent nature.

7. An arrangement for weakening, extinguishing and deflecting reflection echos, waves and the like comprising an areal regular arrangement of a plurality of elements, arranged in phase opposition in two adjoining planes, which are associated with each other and divert the incoming wave trains in a mutually opposite phase, said elements joined in an areal space grid of webs having a length not greater than the wave lengths being deflected and forming the edges of imagined tetrahedrons which are joined with each other at the bases and form an areal grid system whose thickness is equal to the height of said tetrahedrons, said grid being of elastic material, and the individual grid elements being hollow, the cavities of all elements being in communication with each other so that the grid can be increased by inflation and the distance of the grid tops and bottoms containing the ends of the elements can thus be adapted to the different wave lengths.

8. An arrangement for weakening, extinguishing and deflecting reflection echos, waves and the like comprising an areal regular arrangement of a plurality of elements, arranged in phase opposition in two adjoining planes, which are associated with each other and divert the incoming wave trains in a mutually opposite phase, said plurality of elements including nail elements with relatively large heads.

9. An arrangement according to claim 8 wherein the height of a plurality of said heads with relation to a base is equal to lambda/4.

References Cited by the Examiner

UNITED STATES PATENTS

| | | | |
|---|---|---|---|
| 2,107,038 | 2/1938 | Lennard | 343—18 |
| 2,412,562 | 12/1946 | Cranshaw | 139—562 |
| 2,464,006 | 3/1949 | Tiley | 343—18 |
| 2,527,918 | 10/1950 | Collard | 343—18 |
| 2,636,125 | 4/1953 | Southworth | 250—33.63 |
| 2,840,179 | 6/1958 | Junger | 181—33 |

CHESTER L. JUSTUS, *Primary Examiner.*

G. M. FISHER, *Assistant Examiner.*